United States Patent [19]

Johne et al.

[11] 4,023,423
[45] May 17, 1977

[54] VARIABLE-STROKE AND FREQUENCY DRIVE

[75] Inventors: Hans Johne, Radebeul; Arndt Jentzsch, Coswig; Günter Schumann, Radebeul, all of Germany

[73] Assignee: Veb Polygraph Leipzig Kombinat fur Polygraphische Maschinen und Ausrustungen, Leipzig, Germany

[22] Filed: June 19, 1975

[21] Appl. No.: 588,469

[52] U.S. Cl. .................................................. 74/96
[51] Int. Cl.² ........................................ F16H 21/44
[58] Field of Search ........................................ 74/96

[56] References Cited
UNITED STATES PATENTS 1,276,472  8/1918  Zeen ........................................ 74/96

FOREIGN PATENTS OR APPLICATIONS 1,003,047  2/1957  Germany ................................ 74/96
393,182    4/1924  Germany ................................ 74/96

Primary Examiner—Samuel Scott
Assistant Examiner—Wesley S. Ratliff, Jr.
Attorney, Agent, or Firm—Michael J. Striker

[57] ABSTRACT

A four-bar kinematic chain has an input member which includes a portion formed with a guide channel, an elongated output member that is pivoted intermediate its end portions, and a link member having one end pivoted to one end portion of the output member and another end portion provided with a sliding block received in the guide channel. A crank drive is connected with the input member for oscillating the same and the guide channel, to thereby effect oscillatory movement of the other end portion of the output member and concomitant movement of an element to which the other end portion is coupled. An arrangement is provided for arresting the sliding block at selected locations in the guide channel, to thereby permit a variation in the stroke and frequency of the movements of the other end portion of the output member.

8 Claims, 2 Drawing Figures

VARIABLE-STROKE AND FREQUENCY DRIVE

BACKGROUND OF THE INVENTION

The present invention relates to a drive, and in particular to a variable-stroke and frequency drive. Still more particularly, the invention relates to a variable-stroke and frequency drive for use with ink-distributing cylinders of printing machines.

It is known from the prior art to provide arrangements for varying the stroke and frequency of movements of ink-distributing cylinders in printing machines. The drive in these prior-art arrangements makes it possible to adjust the amplitude of the distributing movement of the cylinder as well as the frequency of these movements. For this purpose the prior-art drive provides a pivotable guide plate with a groove into which a sliding block extends which is fixedly connected with a gear that is turnably mounted on the shaft of the ink-distributing cylinder. The amplitude of the cylinder movement is varied by pivoting the guide plate to vary its inclination, and the frequency of the movement of the cylinder can be adjusted by varying the transmission ratio of a continuously variable drive that cooperates with the gear.

However, the prior-art arrangement just described has various disadvantages. One of these is the fact that it is quite complicated in construction in that it requires separate drives for the variation of the stroke and for the variation of the frequency of the cylinder movements, and is therefore highly susceptible to malfunction. In addition it is difficult to adjust the two drives so that they properly cooperate with one another, and improper settings, resulting in improper operation of the ink distributing cylinder, are impossible to avoid.

SUMMARY OF THE INVENTION

Accordingly, it is a general object of this invention to overome the disadvantages of the prior art.

More particularly, it is an object of the present invention to provide a variable-stroke and frequency drive which is particularly suited for use with ink-distributing cylinders of printing machines, and which is simple in its construction.

Another object of the invention is to provide such a drive which provides for a simple manner of adjusting the stroke and frequency of the cylinder movements.

A further object of the invention is to provide such a drive wherein the frequency of the distributing movement performed by the cylinder is changed automatically and as a result of adjustments in the variation of the stroke of the cylinder without requiring separate means for effecting such adjustment of the frequency.

In keeping with these objects, and with others which will become apparent hereafter, one feature of the invention resides in a variable-stroke and frequency drive, particularly for use with ink-distributing cylinders of printing machines, which comprises means forming a four-bar kinematic chain having an input member which includes a portion formed with a guide channel, an elongated output member pivoted intermediate its end portions, and a link member having one end pivoted to one end portion of said output member and another end portion provided with a sliding block received in the guide channel. A crank drive is connected with the input member for oscillating the same and the guide channel, to thereby effect oscillatory movement of the other end portion of the output member and concomitant movement of an element to which the other end portion is coupled.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
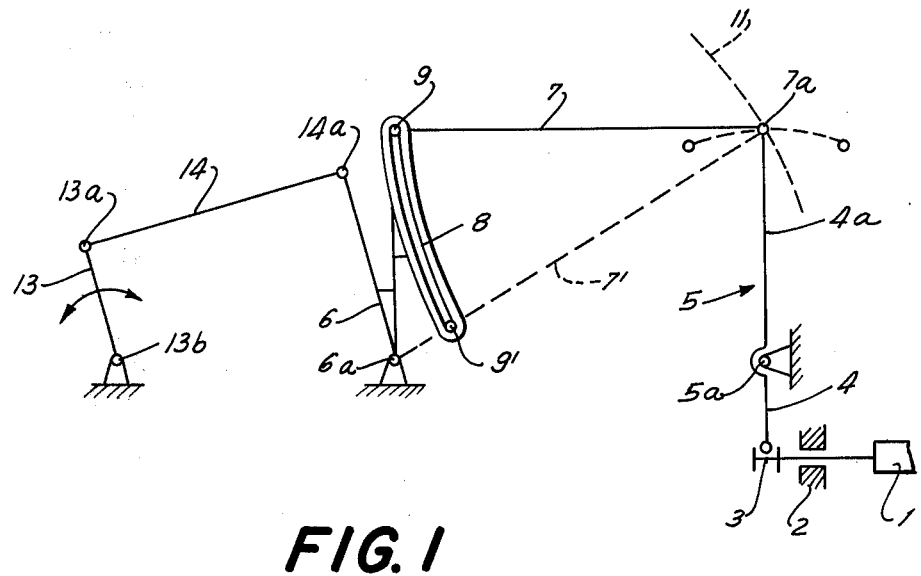
FIG. 1 is a diagrammatic illustration, showing the principle of a first embodiment of the invention.

Referring now to the drawing in detail it is firstly pointed out that the illustrated embodiments are particularly (although not exclusively) suited for varying the stroke and frequency of movement of an ink-distributing cylinde of a printing machine, or of more than one such cylinder. It is not believed necessary to describe or illustrate in detail the construction and operation of such ink-distributing cylinders, or of the printing machine in which they are utilized. However, for further background reference is made to German Pat. No. 1,128,866 which is incorporated herein by reference.

Referring firstly to FIG. 1 it will be seen that an ink-distributing cylinder is fragmentarily and diagrammatically shown and identified with reference numeral 1. It is mounted with its shaft in a machine frame 2, a portion of which is shown, and can be shifted axially of the shaft. The shaft carries at its free end a member having a circumferential groove 3, or else the groove 3 can be formed directly in the shaft. In any case, an arm 4 of a double-armed lever 5 extends with one end portion into the groove 3. The member 5 is pivoted at 5a to the machine frame or another stationary support and constitutes the output member of a four-bar kinematic chain having additionally the input member 6 which is pivoted to stationary support at 6a, and the link member 7. The link member 7 is pivoted at 7a to the other arm 4a of the output member 5, and at its end remote from the pivot point 7a the link member 7 is provided with a sliding block 9 which is slidably received in a guide channel 8 formed in a portion of the input member 6; this portion having the guide channel 8 is fixedly connected with and forms a part of the input member 6, to pivot with the same about the pivot 6a. The sliding block 9 can be moved in the guide channel 8 to a plurality of positions therein, including the solid-line end position shown and the broken-line position 9', and in any of these positions it can be arrested by a not-illustrated arresting device which can be of any of the many types of arresting devices known in the art. It is preferred that the guide channel 8 be arcuately curved and that the radius of curvature correspond to the length of the link member 7. When the link member 7 is in the broken-line end position 7' in which the sliding block 9 is in the end position 9', a line (an imaginary line) extending lengthwise of the link member 7 will pass through the pivot point 7a and through the pivot point 6a. When the arrangement is in the solid-line positions 7, 9, the center of curvature of the arcuately curved guide channel 8 coincides with the pivot point 7a which moves during the oscillatory movement of the input member 6 in an arcuate path 11 that intersects the arcuate path 12 in which the free end of the arm 4a of the output member 5 travels during the oscillatory movement of the input member 6. Additional output members 5 may be connected to the one that is illustrated, for example to the arm 4 thereof, and each of these may cooperate with and control a further ink-distributing cylinder 1 by engaging a groove 3 thereof.

The motion necessary to control the movements of the ink-distributing cylinder 1 is imparted to the four-bar kinomatic chain 5, 6, 7 by a crank drive having the member 13 that is pivoted at 13b to a stationary support and can be oscillated in the direction of the double-headed arrow by a not-illustrated drive component. The member 13 is pivoted at 13a to a member 14 of the crank drive, which in turn is pivoted at 14a to the input member 6 of the kinematic chain.

Figure 2:
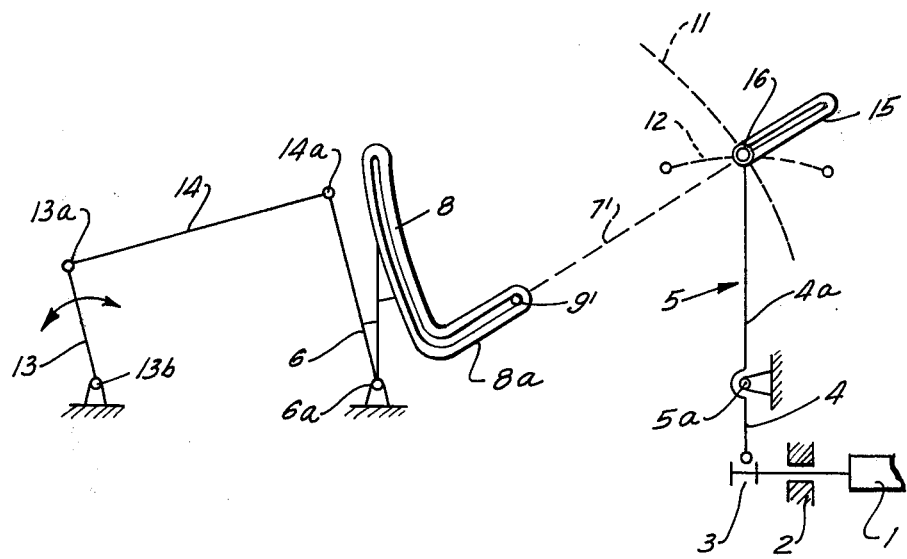
FIG. 2 is a view similar to FIG. 1, but showing the principle of a second embodiment of the invention.

A somewhat modified embodiment of the invention is illustrated in FIG. 2, wherein like reference numerals identify like components as in FIG. 1. FIG. 2 differs from FIG. 1 in the configuration of the portion of the input member 6 that is formed with the guide channel 8. The guide channel 8 is essentially the same as in FIG. 1 but is provided with a portion 8a that extends from one of its ends lengthwise of the member 7 (the latter is shown in its end position 7'), i.e. the portion 8a of the guide channel 8 extends lengthwise of the member 7 when the latter is in the end position 7' thereof. The member 7 is further provided with a guide 15 having a guide slot which extends lengthwise of the member 7 and in which a sliding block 16 is received that is mounted on the free end of the arm 4a of the output member 5. Just as the sliding block 9 can be arrested in any position lengthwise of the guide channel 8, 8a, the sliding block 16 can be moved to a plurality of positions in the channel of the guide 15 and can be arrested therein by means of a not illustrated but well known arresting device.

In operation of the embodiments of FIGS. 1 and 2, the four-bar kinematic chain 5, 6, 7 is oscillated via the crank drive 13, 14, and thus the arm 4 of the output member 5 effects an axial oscillation of the distributing cylinder 1. To change the stroke of the cylinder 1 the sliding block 9 is moved from its outer end position (see FIG. 1 in solid line) to an intermediate position which with the inner end position 9', under simultaneous movement of course of the link member 7 to the position 7', and arrested in the selected position. When the sliding block is in the inner end position 9', the stroke frequency is automatically doubled as a result of this movement from position 9 to position 9', and this means that even if the stroke performed by the distributing cylinder 1 is short, a high distributing intensity for the ink is obtained.

The arrangement of the present invention, wherein in the solid-line position shown in FIG. 1 and the equivalent position in FIG. 2 the center of curvature of the guide track 8 is identical with the pivot point 7a, a symmetrical displacement is obtained. To increase the ink distributing intensity at doubled stroke the embodiment of FIG. 2 makes it possible to reduce the length of the link member 7 of the kinomatic chain and thereby to increase the stroke during the double frequency of movement.

The invention thus makes it possible to vary the stroke and frequency of movement of the ink-distributing cylinder 1 without requiring any additional means or devices and utilizing only a single drive, namely the illustrated crank drive.

It will be understood that each of the elements described above, or two or more together, may also find a useful application in other types of constructions differing from the types described above.

While the invention has been illustrated and described as embodied in a variable-stroke and frequency drive, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential chracteristics of the generic or specific aspects of this invention.

What is claimed as new and desired to be protected by Letters Patent is set forth in the appended claims.

We calim:

1. A variable-stroke and -frequency drive, particularly for use with ink-distributing cylinders of printing machines, comprising means forming a four-bar kinematic chain having a support, an input member mounted on said support for pivoting movement about a first pivot, said input member including a portion formed with a guide channel, an elongated output member pivoted to said support imtermediate its end portions, and a link member having one end pivoted to one end portion of said output member for movement about a second pivot, and another end portion provided with a sliding block received at fixed locations in said guide channel for pivoting movement about a third pivot; an elongated element mounted on said support for lengthwise reciprocation and adapted to be coupled to said output member; and means for varying the stroke and for simultaneously varying the frequency of reciprocation of said reciprocating element, including a crank drive connected with said input member for oscillating the other members at each of said fixed locations so that said third pivot passes through a straight line extending through both said first and second pivots at one of said fixed locations for changing the direction of pivoting movement of said output member and thereby the direction of reciprocation of said element, to thereby effect different stroke and frequency characteristics for the element at said one fixed location as compared to the other of said fixed locations.

2. A drive as defined in claim 1; and further comprising means for shifting said sliding block to selected positions in said channel, and for arresting the sliding block at the respective positions.

3. A drive as defined in claim 1, wherein said guide channel is arcuately curved in longitudinal direction.

4. A drive as defined in claim 3, wherein the radius of curvature of said guide channel substantially equals the length of said link member.

5. A drive as defined in claim 3, and said input member being pivotable between two end positions through a middle position; and wherein the center of curvature of said second guide channel coincides with said pivot when said input member is in said middle position thereof.

6. A drive as defined in claim 1, said link member being elongated and said sliding block being shiftable in said guide channel to an inner and an outer end position through a plurality of intermediate positions; and said straight line constituting an extension of the elongation of said link member and passes through said pivots when said sliding block is in said inner end position.

7. A drive as defined in claim 6, wherein said guide channel has an arcuate first portion and a straight second portion extending from one end of said first portion in direction toward said one end portion of said output member; further comprising a guide provided on said kinematic chain and having a further guide channel; and wherein said one end portion of said output member is provided with a further sliding block which is received in said guide.

8. A variable-stroke and -frequency drive for driving elements, particularly ink-distributing cylinders of printing machines, comprising a support; an input member mounted on said support for pivoting movement about a first pivot; means for driving said input member through a range between end limiting positions; an output member pivotally mounted on said support and adapted to be coupled to an element to be driven; a link member intermediate said input and output members and being mounted on said output member for pivoting movement about a second pivot; and means for varying the stroke length and for simultaneously varying the frequency of movement of the element, including means for mounting said link member on said input member for pivoting movement about a third pivot at a first fixed location on said input member so that, during movement of said input member through said range, the direction of pivoting movement of said output member relative to said support is reversed each time said third pivot reaches an end position, thereby resulting in the generation of a first stroke and frequency characteristic for the element, and at a second fixed location on said input member in which said third pivot passes through a straight line extending through all of said pivots so that, during movement of said input member through said range, the direction of pivoting movement of said output member relative to said support is reversed each time said third pivot reaches an end position and also when said third pivot reaches an intermediate position between said end positions in which it passes through said straight line, whereby a second different stroke and doubled frequency characteristic for the element is generated.

\* \* \* \* \*